US011708956B2

(12) United States Patent
Menjo

(10) Patent No.: US 11,708,956 B2
(45) Date of Patent: Jul. 25, 2023

(54) VEHICLE LAMP AND VEHICLE SYSTEM

(71) Applicant: KOITO MANUFACTURING CO., LTD., Tokyo (JP)

(72) Inventor: Yosuke Menjo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/469,879

(22) Filed: Sep. 9, 2021

(65) Prior Publication Data

US 2022/0082227 A1    Mar. 17, 2022

(30) Foreign Application Priority Data

Sep. 14, 2020   (JP) .................................. 2020-153908

(51) Int. Cl.

| F21S 41/675 | (2018.01) |
| F21S 41/151 | (2018.01) |
| F21S 41/255 | (2018.01) |
| B62J 6/023 | (2020.01) |
| B60Q 1/10 | (2006.01) |
| F21S 41/32 | (2018.01) |
| F21Y 115/10 | (2016.01) |

(52) U.S. Cl.
CPC .............. *F21S 41/675* (2018.01); *B60Q 1/10* (2013.01); *B62J 6/023* (2020.02); *F21S 41/151* (2018.01); *F21S 41/255* (2018.01); *B60Q 2300/136* (2013.01); *B60Q 2300/42* (2013.01); *F21S 41/32* (2018.01); *F21Y 2115/10* (2016.08)

(58) Field of Classification Search
CPC ....... B60Q 1/10; B60Q 1/0023; F21S 41/141; F21S 41/153; F21S 41/151
See application file for complete search history.

(56) References Cited

U.S. PATENT DOCUMENTS

| 10,005,384 B2* | 6/2018 | Canonne | ............... F21S 41/675 |
| 10,767,829 B2* | 9/2020 | Kogure | ................ F21S 41/141 |
| 11,254,384 B2* | 2/2022 | Harada | ................. B60Q 1/122 |
| 2018/0186278 A1* | 7/2018 | Song | ...................... B60Q 1/076 |
| 2022/0119061 A1* | 4/2022 | Kimura | .................... B62J 6/024 |

FOREIGN PATENT DOCUMENTS

| WO | WO-2018168249 A1 * | 9/2018 | ............... B60Q 1/12 |
| WO | 2019/039051 A1 | 2/2019 | |

* cited by examiner

*Primary Examiner* — Matthew J. Peerce
(74) *Attorney, Agent, or Firm* — Venjuris, P.C.

(57) ABSTRACT

A vehicle lamp includes: a light source that emits a light; an optical member including a lens that irradiates the light from the light source to a front of the vehicle lamp and forms a predetermined light distribution pattern including a plurality of regions; and a controller that, when an object outside the vehicle is detected, adjusts the predetermined light distribution pattern so as not to irradiate at least one first region including the object among the plurality of regions with the light. When the vehicle body is in a cornering state, the controller acquires inclination information of the vehicle body, determines whether there is a second region that does not exceed a reference line, based on the inclination information, and when determining that there is the second region, irradiates the second region with the light even when the object is included in the second region.

11 Claims, 8 Drawing Sheets

VEHICLE LAMP AND VEHICLE SYSTEM

CROSS-REFERENCE TO RELATED APPLICATIONS

This application is based on and claims priority from Japanese Patent Application No. 2020-153908, filed on Sep. 14, 2020, with the Japan Patent Office, the disclosure of which is incorporated herein in its entirety by reference.

TECHNICAL FIELD

The present disclosure relates to a vehicle lamp and a vehicle system.

BACKGROUND

As for a headlamp for a motorcycle, there is a high beam/low beam light source (see, e.g., International Application Publication No. WO2019/039051).

SUMMARY

In a four-wheeled vehicle, for example, a system has been proposed in which a light distribution pattern emitted from a headlamp is configured by a plurality of regions arranged in a horizontal direction and a part of the plurality of regions is not irradiated according to an object outside a vehicle, thereby forming a light distribution pattern that does not give glare to an oncoming vehicle. In a two-wheeled vehicle, a driver moves the center of gravity when turning left or right, tilts the vehicle body in a direction of turning, and travels in the corner while increasing a bank angle. Thus, the light distribution pattern formed by the headlamp also tilts from the horizontal direction with the bank angle. In some cases, in a light distribution pattern tilted from the horizontal direction, when trying to adopt a system similar to the four-wheeled vehicle so as not to give glare to an object such as an oncoming vehicle, the non-irradiation range needs to be expanded to a range that does not originally need to be non-irradiation.

The present disclosure is to provide a vehicle lamp and a vehicle system capable of minimizing the non-irradiation range in which an object is not irradiated with light in a light distribution pattern formed in a state where the vehicle body is tilted.

According to an aspect of the present disclosure, a vehicle lamp is provided for vehicles traveling in corners by tilting the vehicle body in the direction of turning. The vehicle lamp includes: a light source; an optical member that irradiates a light from the light source to a front of the vehicle lamp and forms a predetermined light distribution pattern including a plurality of regions formed in parallel in one direction; and a control unit that, when an object outside the vehicle is detected, adjusts the predetermined light distribution pattern so as not to irradiate at least one first region including the object among the plurality of regions with the light. When the vehicle body is in a cornering state, the control unit acquires inclination information of the vehicle body, determines, based on the inclination information, whether there is a second region that does not exceed a reference line along a horizontal direction in at least one first region, and when it is determined that there is the second region, irradiates the second region with the light even when the object is included in the second region.

According to another aspect of the present disclosure, a vehicle system is provided for vehicles traveling in corners by tilting the vehicle body in the direction of turning. The vehicle system includes: a vehicle lamp including a light source, and an optical member that irradiates a light from the light source to a front of the lamp and forms a predetermined light distribution pattern including a plurality of regions formed in parallel in one direction; a sensor that detects an object outside the vehicle; and a control unit that, when the object is detected by the sensor, adjusts the predetermined light distribution pattern so as not to irradiate at least one first region including the object among the plurality of regions with the light. The control unit sets a reference line along a horizontal direction based on position information of the object acquired by the sensor, acquires inclination information of a vehicle body when the vehicle body is in a cornering state, determines, based on the inclination information, whether there is a second region that does not exceed the reference line along the horizontal direction in at least one first region, and when it is determined that there is the second region, irradiates the second region with the light even when the object is included in the second region.

The present disclosure provides a vehicle lamp and a vehicle system capable of minimizing the non-irradiation range in which an object is not irradiated with light in a light distribution pattern formed in a state where the vehicle body is tilted.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

The embodiments of the present disclosure will be described with reference to the accompanying drawings. In the present embodiment, the terms "left and right direction,"

Figure 1:
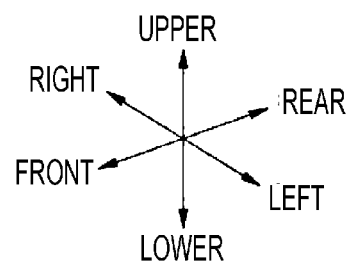
FIG. 1 is a perspective view of a vehicle provided with a headlamp (vehicle lamp) according to a first embodiment of the present disclosure.
Figure 1:
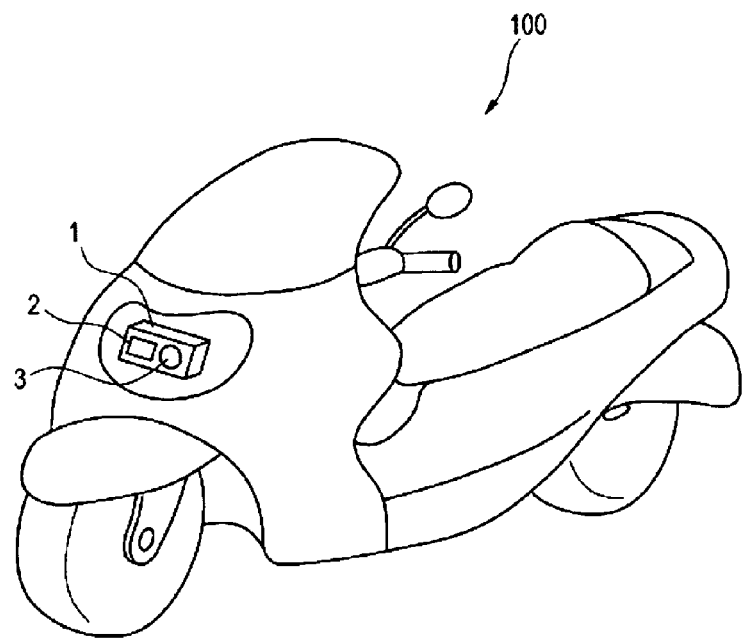

"front and rear direction," and "upward and downward direction" refer to the relative directions set for a vehicle 100 illustrated in FIG. 1 for convenience of explanation.

First Embodiment

FIG. 1 illustrates a motorcycle 100 as an example of a vehicle according to a first embodiment. The motorcycle 100 is a vehicle capable of traveling along a corner (curve) of a road by tilting the vehicle body in a turning direction. Like the motorcycle 100, the vehicle of the present embodiment may be a vehicle that may travel in a corner by tilting the vehicle body in a turning direction, and the number of wheels is not limited. Therefore, for example, even a three-wheeled vehicle or a four-wheeled vehicle is included in the vehicle of the present embodiment as long as it can travel in the same manner as the motorcycle 100.

As illustrated in FIG. 1, a headlamp 1 (an example of a vehicle lamp) according to the present embodiment is mounted on a front portion of the motorcycle 100. The headlamp 1 is a lamp capable of irradiating the front of the vehicle, and includes a low beam lamp unit 2 and a high beam lamp unit 3. In the present embodiment, the motorcycle 100 having one headlamp 1 is illustrated, but, it may be, for example, a motorcycle having one headlamp on each side.

Figure 2:
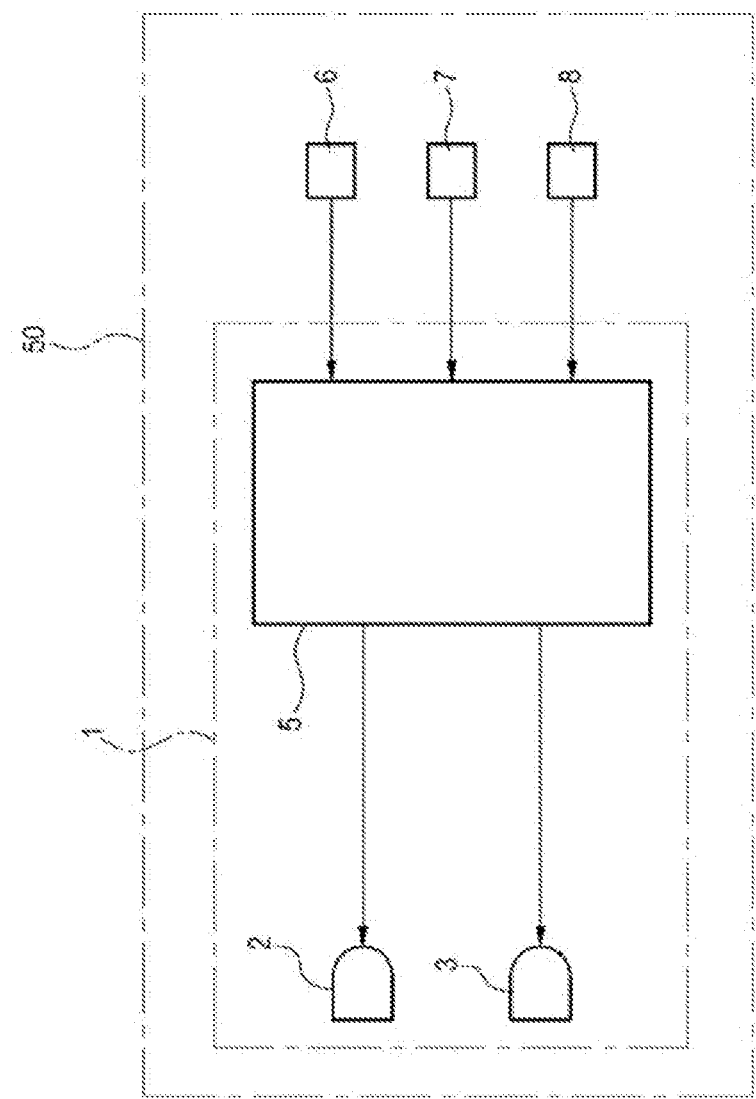
FIG. 2 is a block diagram of a vehicle system mounted on a vehicle.

FIG. 2 is a block diagram of a vehicle system 50 mounted on the motorcycle 100. As illustrated in FIG. 2, the vehicle system 50 includes a headlamp 1 and various sensors 6 to 8. The headlamp 1 has a lamp control unit 5 that controls the operation of a low beam lamp unit 2 and a high beam lamp unit 3. The low beam lamp unit 2 and the high beam lamp unit 3 are connected to the lamp control unit 5. The various sensors 6 to 8 include a bank angle sensor 6 that detects the tilted state of the motorcycle 100, an external sensor 7 that detects environmental information outside the vehicle, and a speed sensor 8 that detects the speed of the motorcycle 100. The bank angle sensor 6, the external sensor 7, and the speed sensor 8 are connected to the lamp control unit 5.

The bank angle sensor 6 is a sensor capable of detecting the inclination angle when the vehicle body of the motorcycle 100 is inclined to the left or right with respect to the vertical line. The bank angle sensor 6 is constituted by, for example, a gyro sensor. The inclination angle of the vehicle body may be calculated based on, for example, an image taken by a camera mounted on the vehicle body.

The external sensor 7 is a sensor capable of acquiring information on the outside of the own vehicle including the surrounding environment of the motorcycle 100 (e.g., obstacles, other vehicles (vehicles in front, oncoming vehicles), pedestrians, road shapes, and traffic signs). The external sensor 7 is constituted by at least one of, for example, light detection and ranging or laser imaging detection and ranging (LiDAR), a camera, and a radar.

Each information detected by the bank angle sensor 6, the external sensor 7, and the speed sensor 8 is transmitted to the lamp control unit 5. The lamp control unit 5 controls the operation of the low beam lamp unit 2 and the high beam lamp unit 3 based on the information transmitted from the sensors 6 to 8. For example, the lamp control unit 5 may control the headlamp 1 (i.e., the low beam lamp unit 2 and the high beam lamp unit 3) based on the detection information of each sensor and adjust the light distribution pattern (i.e., the low beam light distribution pattern and the high beam light distribution pattern) formed in front of the vehicle.

Figure 3:
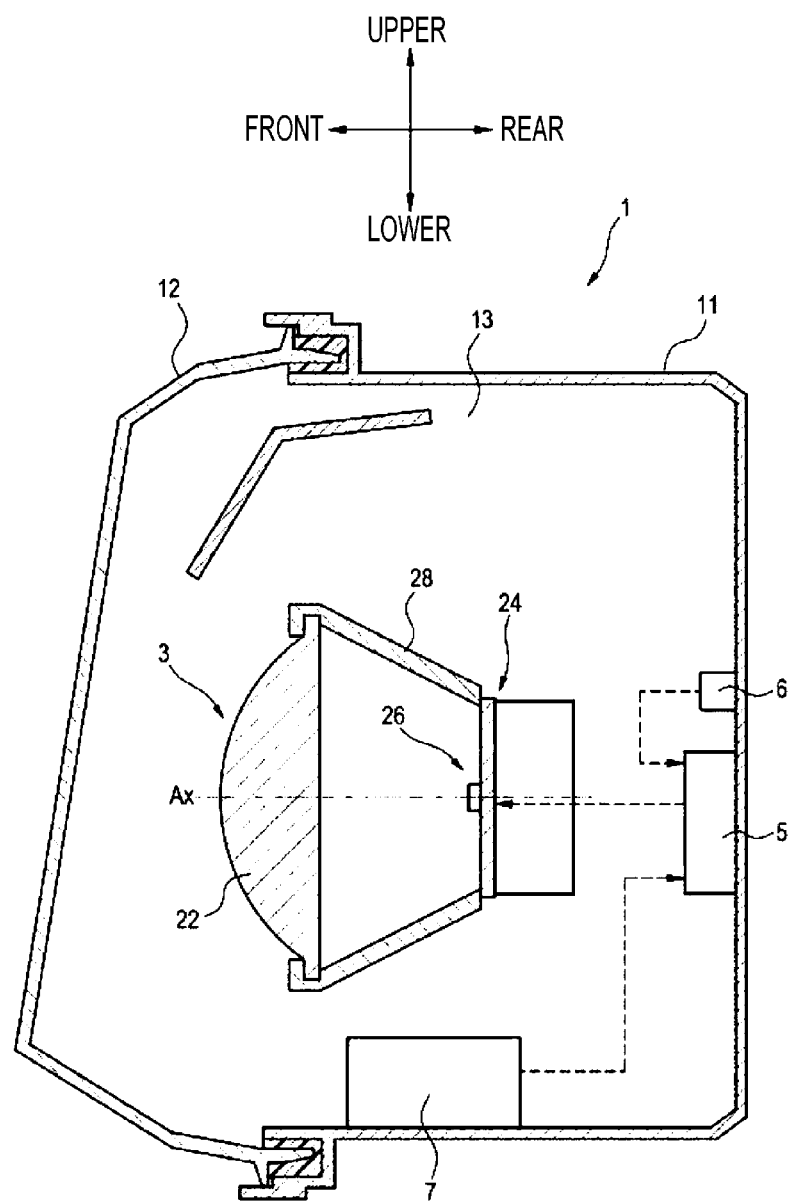
FIG. 3 is a cross-sectional view illustrating the configuration of a high beam lamp unit included in a headlamp.

FIG. 3 is a vertical cross-sectional view illustrating a schematic configuration of a headlamp 1 in which a high beam lamp unit 3 is accommodated. As illustrated in FIG. 3, the headlamp 1 includes a lamp body 11 having an opening on the front of the vehicle, and a transparent front cover 12 attached so as to cover the opening of the lamp body 11. A high beam lamp unit 3, a lamp control unit 5, a bank angle sensor 6, and an external sensor (e.g., LiDAR) 7 are accommodated inside a lamp chamber 13 formed by the lamp body 11 and the front cover 12. Although not illustrated in the cross-sectional view of FIG. 3, the low beam lamp unit 2 is also accommodated in the lamp chamber 13 of the headlamp 1 like the high beam lamp unit 3.

The high beam lamp unit 3 is a so-called projector type lamp, and includes a projection lens 22 (an example of an optical member), a light source unit 24 that has a light source 26 for irradiating a high beam, and a holder 28 that holds the projection lens 22 and the light source unit 24. The projection lens 22 is a plano-convex aspherical lens having a convex front surface and a flat rear surface, and is arranged on the optical axis Ax extending in the front and rear direction of the vehicle. The peripheral edge of the projection lens 22 is held on the front end of the holder 28. The projection lens 22 forms a predetermined light distribution pattern constituted by a plurality of partial regions by irradiating the light from the light source 26 to the front of the lamp.

The light source unit 24 is arranged so that the light source 26 faces forward in the optical axis Ax direction, and is held on the rear end of the holder 28. The light source 26 is electrically connected to the lamp control unit 5. The holder 28 is attached to the lamp body 11 via a support member (not illustrated).

Figure 4:
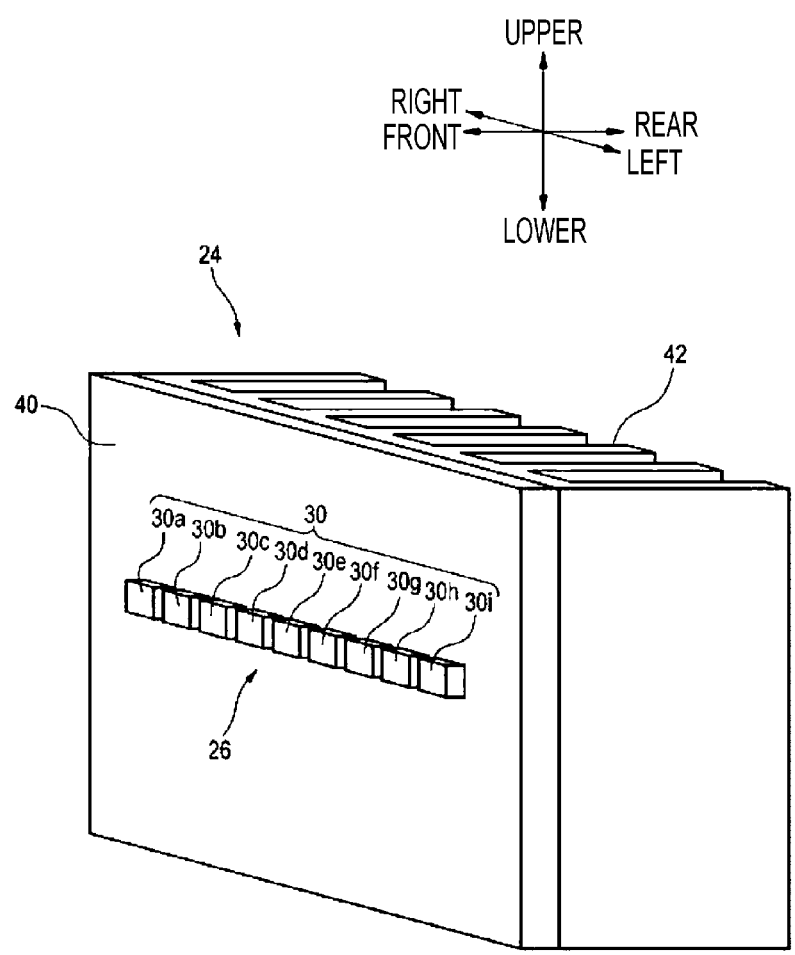
FIG. 4 is a perspective view illustrating the configuration of a light source unit included in the high beam lamp unit of FIG. 3.

FIG. 4 is a perspective view illustrating a schematic structure of the light source unit 24. The light source unit 24 includes a light source 26, a support plate 40, and a heat sink 42. The light source 26 has a plurality of individual light sources 30 constituted by, for example, light emitting elements (LEDs). The light source 26 has, for example, individual light sources 30a to 30i arranged in parallel in the left and right direction (the direction orthogonal to the optical axis Ax) in 9 horizontal columns and 1 vertical row, and is fixed to the front surface of the support plate 40. The individual light sources 30a to 30i are configured as LED arrays. Each of the individual light sources 30a to 30i is electrically connected to the lamp control unit 5. The individual light sources 30a to 30i are controlled to irradiate light independently of each other by the lamp control unit 5 in the adaptive driving beam (ADB) mode (to be described later). The number and arrangement of the individual light sources 30 are not particularly limited.

The heat sink 42 is a member for dissipating heat emitted from the light source 26, and is held on the rear surface of the support plate 40 on the vehicle rear side. The light source unit 24 is fixed to the holder 28 via the support plate 40.

Next, the light distribution pattern formed by the headlamp 1 mounted on the motorcycle 100 will be described with reference to FIGS. 5 and 6.

Figure 5:
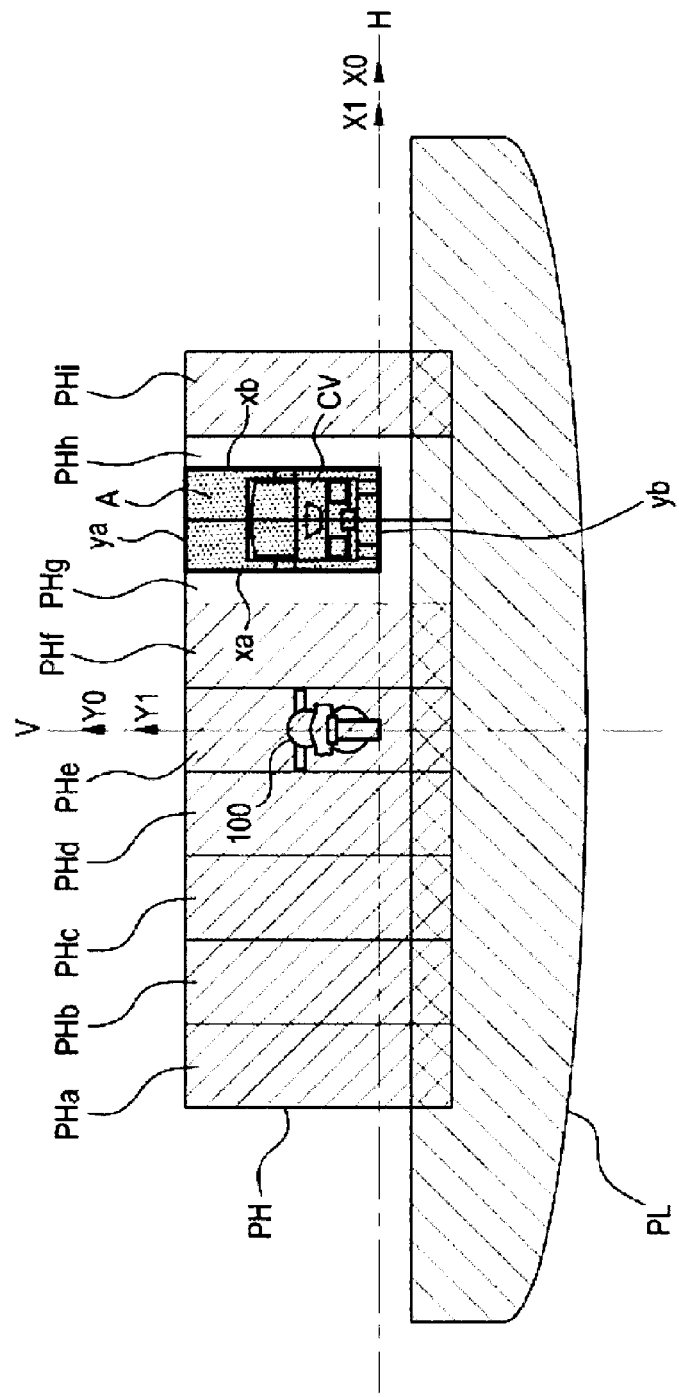
FIG. 5 is a diagram illustrating a high beam light distribution pattern when traveling straight.

FIG. 5 illustrates a light distribution pattern (i.e., the high beam light distribution pattern PH and the low beam light distribution pattern PL) formed in front of the lamp when the vehicle body of the motorcycle 100 is traveling straight, that is, when the motorcycle 100 is traveling with the body perpendicular to the road surface. The case where the vehicle body of the motorcycle 100 is traveling straight includes, for example, the inclination of the vehicle body within ±10 degrees with respect to the case where the vehicle body is vertical. FIG. 6 illustrates a light distribution pattern (in this example, only the high beam light distribution pattern PH is illustrated) formed in front of the lamp when the vehicle body of the motorcycle 100 is in a cornering state, for example, when the vehicle body is tilted to the right with respect to the road surface in order to travel in a right-facing corner. The high beam light distribution pattern PH is a light distribution pattern formed by the high beam lamp unit 3. The low beam light distribution pattern PL is a light distribution pattern formed by the low beam lamp unit 2.

Figure 6:
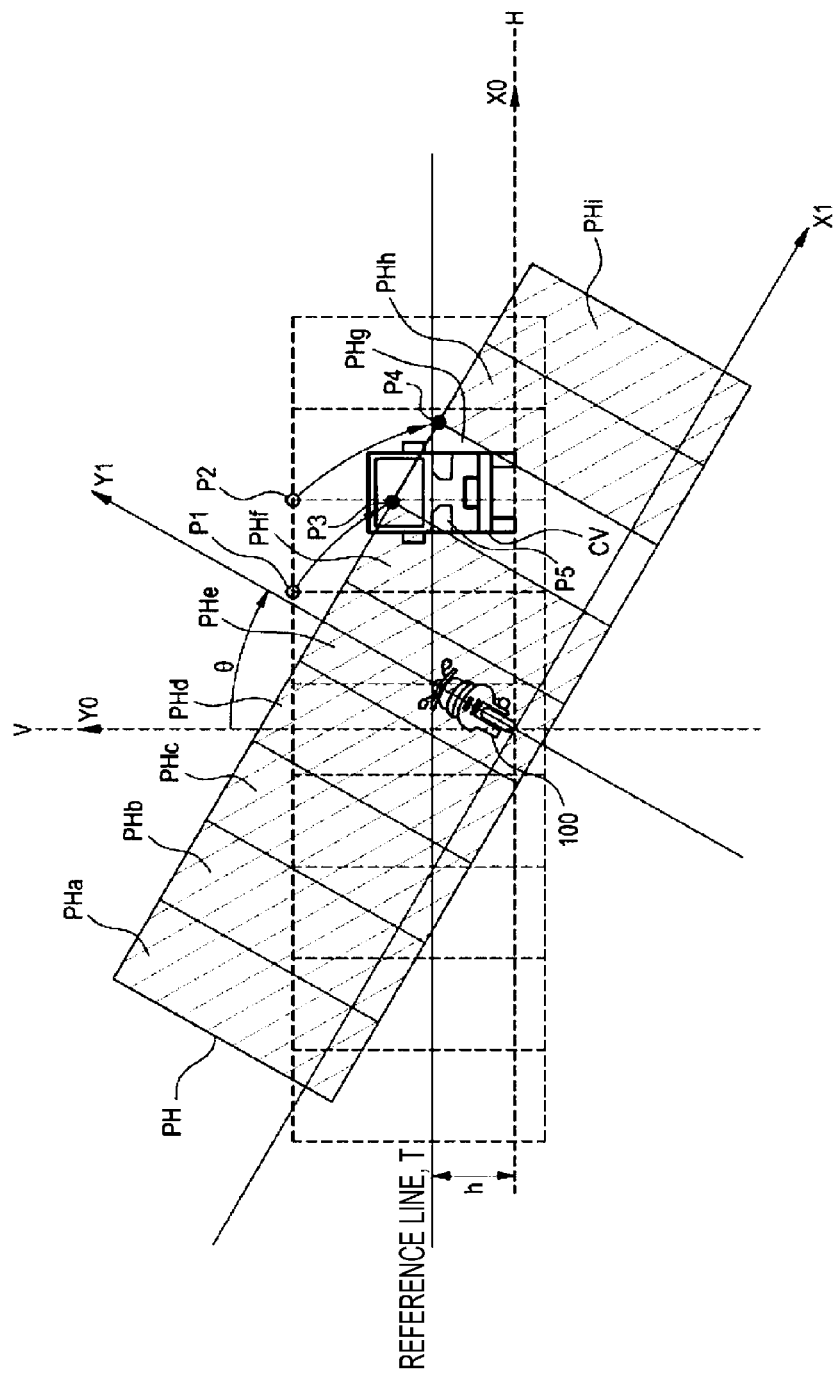
FIG. 6 is a diagram illustrating a high beam light distribution pattern during cornering.

FIGS. 5 and 6 illustrate a light distribution pattern formed on a virtual vertical screen arranged at a predetermined position in front of the lamp, for example, 100 m in front of the lamp. Further, the vehicle illustrated separately from the motorcycle 100 is an oncoming vehicle CV traveling on the right front of the motorcycle 100. The motorcycle 100 and the oncoming vehicle CV are displayed in their respective coordinate systems. The oncoming vehicle CV is displayed on the road coordinate system X0-Y0. The motorcycle 100 is displayed on the motorcycle coordinate system X1-Y1. In the case of FIG. 5 in which the motorcycle 100 is traveling in a straight-ahead state, the road coordinate system X0-Y0 and the motorcycle coordinate system X1-Y1 are displayed in agreement. In the case of FIG. 6 in which the motorcycle 100 is traveling in the cornering state, the road coordinate system X0-Y0 and the motorcycle coordinate system X1-Y1 are displayed differently by the angle at which the motorcycle 100 is tilted. H-H represents the horizontal direction and V-V represents the vertical direction.

As illustrated in FIGS. 5 and 6, the high beam light distribution pattern PH is a light distribution pattern in which a plurality of vertically elongated partial patterns PHa to PHi is formed in parallel in the horizontal direction. Each of the partial patterns PHa to PHi is formed by the light emitted from the individual light sources 30a to 30i. The partial pattern PHa is formed by the individual light source 30a. Similarly, the partial pattern PHb is formed by the individual light source 30b, the partial pattern PHc is formed by the individual light source 30c, the partial pattern PHd is formed by the individual light source 30d, the partial pattern PHe is formed by the individual light source 30e, the partial pattern PHf is formed by the individual light source 30f, the partial pattern PHg is formed by the individual light source 30g, the partial pattern PHh is formed by the individual light source 30h, and the partial pattern PHi is formed by the individual light source 30i. The high beam light distribution pattern PH is formed as a high beam light distribution pattern having a different mode depending on the situation of the own vehicle, the oncoming vehicle, or the vehicle in front by combining the formation and non-formation of each of the partial patterns PHa to PHi in the ADB mode.

Next, the ADB mode executed by the lamp control unit 5 will be described. Based on, for example, the environmental information acquired by the external sensor 7, the lamp control unit 5 detects the situation of the oncoming vehicle including the presence/absence of the oncoming vehicle and the existence position of the oncoming vehicle (e.g., the distance from the motorcycle 100 to the oncoming vehicle, and the position coordinates of the oncoming vehicle on the virtual vertical screen). Further, the lamp control unit 5 detects the situation of the own vehicle based on, for example, the inclination angle information of the vehicle body acquired by the bank angle sensor 6. The lamp control unit 5 also detects the situation of the own vehicle including the traveling and stopping of the own vehicle based on, for example, the speed information acquired by the speed sensor 8. The lamp control unit 5 individually controls turning-on/off of each individual light source 30 based on the information acquired by the external sensor 7, the bank angle sensor 6, and the speed sensor 8. The lamp control unit 5 turns on the individual light source 30 corresponding to a region where the object such as the oncoming vehicle does not exist among the individual light sources 30, and turns off the individual light source 30 corresponding to a region where the object such as the oncoming vehicle exists.

For example, in FIG. 5, the lamp control unit 5 calculates the existing direction of the oncoming vehicle CV (positions on the left and right sides of the oncoming vehicle CV), and the distance from the motorcycle 100 to the oncoming vehicle CV based on the information acquired by the external sensor 7 and the speed sensor 8. The lamp control unit 5 also calculates the traveling inclination angle of the own vehicle based on the information acquired by the bank angle sensor 6. The lamp control unit 5 defines a light-shielding range A for suppressing the oncoming vehicle CV from being irradiated with light based on the information acquired by the external sensor 7 and the bank angle sensor 6. The light-shielding range A is defined as the range in the X0 axis direction between a boundary line xa that passes through the left portion of the oncoming vehicle CV and extends in the Y0 axis direction in the road coordinate system X0-Y0, and a boundary line xb that passes through the right portion of the oncoming vehicle CV and extends in the Y0 axis direction. Further, the light-shielding range A is defined as the range in the Y0 axis direction between a boundary line ya extending in the X0 axis direction through which a point where the boundary lines xa and xb intersect the upper boundary of the high beam distribution pattern PH in the motorcycle coordinate system X1-Y1, and a boundary line yb extending in the X0 axis direction through which a point where the boundary lines xa and xb intersect the X1 axis of the motorcycle coordinate system X1-Y1. The light-shielding range A may be defined as a range slightly larger than the oncoming vehicle CV or a range slightly smaller than the oncoming vehicle CV.

In the example of FIG. 5 in which the road coordinate system X0-Y0 and the motorcycle coordinate system X1-Y1 match, the coordinate values of each point in the light-shielding range A in the road coordinate system X0-Y0 are associated with the same coordinate values in the high beam light distribution pattern PH in the motorcycle coordinate system X1-Y1. The lamp control unit 5 specifies a partial pattern corresponding to a region in the high beam light distribution pattern PH in which the oncoming vehicle CV does not exist in the motorcycle coordinate system X1-Y1 based on the defined light-shielding range A. In FIG. 5, the lamp control unit 5 specifies partial patterns PHa to PHf and PHi as partial patterns in which the oncoming vehicle CV does not exist. The lamp control unit 5 determines that the specified partial patterns PHa to PHf and PHi are irradiation regions. The lamp control unit 5 turns on the individual light sources 30a to 30f and 30i corresponding to the irradiation regions (partial patterns PHa to PHf and PHi). Based on the defined light-shielding range A, the lamp control unit 5 specifies partial patterns PHg and PHh (an example of the first region) corresponding to the region where the oncoming vehicle CV exists in the high beam light distribution pattern PH in the motorcycle coordinate system X1-Y1, and determines that the specified partial patterns PHg and PHh are non-irradiation regions (light-shielding regions). The lamp control unit 5 turns off the individual light sources 30g and 30h corresponding to the irradiation regions (partial patterns PHg and PHh).

As a result, when the motorcycle 100 is traveling in a straight-ahead state, a high beam light distribution pattern PH is formed in which the partial patterns PHg and PHh corresponding to the region where the oncoming vehicle CV exists are non-irradiation regions so as to include the light-shielding range A for not irradiating the oncoming vehicle CV with light. The "non-irradiation region" may include a region that irradiates light with low illuminance to the extent that glare is not given to the driver of the oncoming vehicle.

Next, as illustrated in FIG. 6, when the motorcycle 100 is in a cornering state, for example, when the vehicle body is tilted to the right by an angle θ with respect to the road surface, the motorcycle coordinate system X1-Y1 is tilted by an angle θ with respect to the road coordinate system X0-Y0. Therefore, the oncoming vehicle CV traveling on the road coordinate system X0-Y0 is in a state of being inclined to the left by an angle θ when viewed from the motorcycle 100. In FIG. 6, the road coordinate system X0-Y0 is displayed along the horizontal and vertical directions of the paper surface.

Also, in the case of the example illustrated in FIG. 6, the lamp control unit 5 calculates various types of information regarding the motorcycle 100 and the oncoming vehicle CV based on the information acquired by the bank angle sensor 6, the external sensor 7, and the speed sensor 8. For example, the lamp control unit 5 calculates how the position of the high beam light distribution pattern PH changes due to the motorcycle 100 tilting at an angle θ to the right. Specifically, the lamp control unit 5 calculates to which position the upper left points P1 and P2, which are the upper left positions of the partial patterns PHg and PHh, respectively, defined as the non-irradiation regions, move due to the motorcycle 100 tilting at an angle θ to the right when the motorcycle 100 is in a straight-ahead state.

In the road coordinate system X0-Y0, the coordinate value of the upper left point P1 which is the left upper end position of the partial pattern PHg is defined as (x01, y01), and the coordinate value of the upper left point P2 which is the left upper end position of the partial pattern PHh is defined as (x02, y02). Further, it is assumed that the position of the upper left point P1 moves to the position of the upper left point P3 and the position of the upper left point P2 moves to the position of the upper left point P4 due to the motorcycle 100 tilting at an angle θ to the right. In the road coordinate system X0-Y0, the coordinate value of the upper left point P3 is defined as (x03, y03), and the coordinate value of the upper left point P4 is defined as (x04, y04).

The lamp control unit 5 calculates the coordinate value (x03, y03) of the upper left point P3 based on the coordinate value (x01, y01) of the upper left point P1 and the right inclination angle θ of the motorcycle 100. The coordinate value x03 of the upper left point P3 may be calculated by $x03 = x01 \cos\theta + y01 \sin\theta$. The coordinate value y03 of the upper left point P3 may be calculated by $y03 = -x01 \sin\theta + y01 \cos\theta$.

Further, the lamp control unit 5 calculates the coordinate value (x04, y04) of the upper left point P4 based on the coordinate value (x02, y02) of the upper left point P2 and the right inclination angle θ of the motorcycle 100. The coordinate value x04 of the upper left point P4 may be calculated by $x04 = x02 \cos\theta + y02 \sin\theta$. The coordinate value y04 of the upper left point P4 may be calculated by $y04 = -x02 \sin\theta + y02 \cos\theta$.

The upper left point P3 is a point located at the uppermost position of the partial pattern PHg (the point at which the maximum y coordinate value is obtained) when the motorcycle 100 tilts the vehicle body to the right with respect to the road surface. The upper left point P4 is a point located at the uppermost position of the partial pattern PHh (the point at which the maximum y coordinate value is obtained) when the motorcycle 100 tilts the vehicle body to the right with respect to the road surface. The coordinate values of the upper left points P3 and P4 change according to the inclination angle of the vehicle body.

Next, the lamp control unit 5 calculates the y-axis coordinate value of the upper end of the headlamp P5 mounted on the oncoming vehicle CV. The y-axis coordinate value of the upper end of the headlamp P5 is calculated as a coordinate value (y05) in the road coordinate system X0-Y0. The lamp control unit 5 sets a reference line T that passes through the upper end of the headlamp P5 and is along the horizontal direction H based on the calculated y-axis coordinate value (y05) of the headlamp P5.

Next, when the motorcycle 100 is in a straight-ahead state, the lamp control unit 5 determines whether the coordinate value y03 ($-x01 \sin\theta + y01 \cos\theta$) of the upper left point P3 of the partial pattern PHg among the partial patterns PHg and PHh defined as the non-irradiation region exceeds the height h (coordinate value y05) of the set reference line T. Further, the lamp control unit 5 determines whether the coordinate value y04 ($-x02 \sin\theta + y02 \cos\theta$) of the upper left point P4 of the partial pattern PHh exceeds the height h (coordinate value y05) of the set reference line T. In the example illustrated in FIG. 6, the coordinate value y03 of the upper left point P3 of the partial pattern PHg exceeds the height h of the reference line T. Meanwhile, the coordinate value y04 of the upper left point P4 of the partial pattern PHh exceeds the height h of the reference line T.

Next, the lamp control unit 5 determines that the partial pattern PHh (an example of the second region) that does not exceed the reference line T is a partial pattern that does not give glare to the oncoming vehicle CV. For example, even when a part of the oncoming vehicle CV is included in the partial pattern PHh, since the part is below the headlamp P5 of the oncoming vehicle CV, the lamp control unit 5 determines that even when the light of the partial pattern PHh is irradiated to a part thereof, it does not cause glare for the driver of the oncoming vehicle CV. Then, the lamp control unit 5 sets the partial pattern PHh, which is determined not to cause glare for the driver of the oncoming vehicle CV, in the irradiation region to irradiate the light of the light source 26. The lamp control unit 5 determines that the partial pattern PHg exceeding the reference line T is a partial pattern that gives glare to the oncoming vehicle CV. Then, the lamp control unit 5 sets the partial pattern PHg in a non-irradiation region (light-shielding region) in which the light of the light source 26 is not irradiated. This maintains the setting of the non-irradiation region with respect to the partial pattern PHg set when the motorcycle 100 is in the straight-ahead state.

Next, the lamp control unit 5 turns off the individual light source 30g corresponding to the non-irradiation region (partial pattern PHg). Meanwhile, the lamp control unit 5 turns on the individual light sources 30a to 30f, 30h, and 30i corresponding to the partial patterns PHa to PHf, PHh, and PHi other than the partial pattern PHg. As a result, when the motorcycle 100 is traveling in a cornering state, a high beam light distribution pattern PH is formed that may irradiate a wider area with light that does not give glare while suppressing the oncoming vehicle CV that is tilted with respect to the motorcycle 100 from being irradiated with light that gives glare.

The inclination angle θ of the motorcycle coordinate system X1-Y1 with respect to the road coordinate system X0-Y0 increases as the inclination of the vehicle body with respect to the road surface increases. Therefore, as the inclination of the motorcycle 100 to the right with respect to the road surface becomes larger, the coordinate value (x03, y03) of the upper left point P3 of the partial pattern PHg changes greatly in the lower right direction from the coordinate value (x01, y01) of the upper left point P1 of the partial pattern PHg when the vehicle body is traveling perpendicular to the road surface. Similarly, the coordinate value (x04, y04) of the upper left point P4 of the partial pattern PHh changes greatly in the lower right direction from the coordinate value (x02, y02) of the upper left point P2 of the partial pattern PHh when the vehicle body is traveling perpendicular to the road surface. As a result, when the motorcycle 100 tilts the vehicle body to the right at an angle θ, the positions of the partial patterns PHe to PHi of the high beam light distribution pattern PH, which are formed in the right direction of the motorcycle 100, move in the lower right direction. Also, the range of the partial pattern determined to be the non-irradiation region that gives glare to the oncoming vehicle CV becomes smaller by the partial pattern PHh than the range of the non-irradiation region (partial patterns PHg and PHh) illustrated in FIG. 5.

When the tilted state of the motorcycle 100 changes so that a part of the oncoming vehicle CV above the headlamp P5 is newly included in the region of the partial pattern PHf, the lamp control unit 5 determines that the partial pattern PHf is a partial pattern that gives glare to the oncoming vehicle CV. Then, the lamp control unit 5 sets the partial pattern PHf in the non-irradiation region (light-shielding region) and turns off the corresponding individual light source 30f.

As described above, the vehicle lamp (headlamp) 1 according to the present embodiment is provided on the motorcycle 100 traveling in a corner by tilting the vehicle body in a turning direction. The vehicle lamp 1 includes a projection lens 22 (an example of an optical member) that forms a predetermined high beam light distribution pattern PH including a plurality of partial patterns PHa to PHi formed in parallel in one direction by irradiating the light source 26 and the light from the light source 26 in front of the headlamp 1, and a lamp control unit 5 that adjusts the high beam light distribution pattern PH so as not to irradiate the first region including the oncoming vehicle CV among the plurality of partial patterns PHa to PHi with the light from the light source 26 when an oncoming vehicle CV (an example of an object) outside the vehicle is detected. Then, the lamp control unit 5 is configured to acquire the inclination information of the vehicle body when the vehicle body is in the cornering state, determine whether there is a second region in the first region that does not exceed the reference line T along the horizontal direction based on the acquired inclination information, and when it is determined that the second region exists, irradiate the second region with the light from the light source 26 even when the oncoming vehicle CV is included in the second region. For example, even when a part of the oncoming vehicle CV is irradiated with the light from the light source 26, when the irradiated light does not cause glare for the driver of the oncoming vehicle CV, a part of the oncoming vehicle CV may be irradiated with the light from the light source 26, and a wider high beam light distribution pattern PH may be formed. According to the configuration of the vehicle lamp 1, it is possible to set the position of the reference line T to a position that does not give glare to the driver of the oncoming vehicle CV based on the acquired inclination information of the vehicle body. Therefore, in the high beam light distribution pattern PH formed in a state where the vehicle body of the motorcycle 100 is tilted, the non-irradiation range in which the oncoming vehicle CV is not irradiated with light may be made as small as possible. The object to be shielded from light is not limited to the oncoming vehicle CV, and may be, for example, a vehicle in front. Even when the same control is performed on the vehicle in front, the non-irradiation range in the high beam light distribution pattern PH may be made as small as possible.

Further, according to the vehicle lamp 1, the oncoming vehicle CV is a vehicle equipped with at least one lamp (headlamp P5 in FIG. 6), and the reference line T is defined to pass through the upper end of the headlamp P5. In this way, since the reference line T is defined with reference to the position of the headlamp P5 mounted on the oncoming vehicle CV, it is possible to reliably suppress the occurrence of glare on the oncoming vehicle CV. Further, the oncoming vehicle CV is not limited to the motorcycle, but may be applied to, for example, a three-wheeled vehicle equipped with at least one headlamp and a motorcycle so that it is possible to reliably suppress the occurrence of glare even for these oncoming vehicles.

Further, according to the vehicle lamp 1, the light source 26 includes a plurality of individual light sources 30a to 30i including light emitting elements arranged in parallel, and the partial patterns PHa to PHi are formed in parallel along the horizontal direction by the light from the individual light sources 30a to 30i. The lamp control unit 5 forms a predetermined high beam light distribution pattern PH by turning on the individual light sources that form the second region of the individual light sources 30a to 30i that does not exceed the reference line T, while turning off the individual light sources that form regions other than the second region in the first region including the oncoming vehicle CV. Therefore, it is possible to switch between the irradiation region and the non-irradiation region of the partial patterns PHa to PHi in the high beam light distribution pattern PH by simply configuring, for example, the light source 26 using an LED array.

In the above embodiment, descriptions have been made on an example in which the reference line T is defined to pass through the upper end of the headlamp P5, but the present disclosure is not limited thereto. For example, in the vehicle system 50 including the headlamp 1, the external sensor 7, and the lamp control unit 5, the reference line T may be determined based on the position information of the oncoming vehicle CV acquired by the external sensor 7. That is, the position information of the oncoming vehicle CV, particularly, the position information of the driver of the oncoming vehicle CV, may be acquired by the external sensor 7, and the reference line T may be determined with the height h that does not interfere with the driver. Even with this configuration, in the high beam light distribution pattern PH formed in a state where the vehicle body of the motorcycle 100 is tilted, as in the vehicle lamp 1, the non-irradiation range in which the oncoming vehicle CV is not irradiated with light may be made as small as possible.

Further, in the above embodiment, descriptions have been made on the case where the motorcycle 100 tilts the vehicle body to the right with respect to the road surface. However, for example, even when the motorcycle 100 tilts the vehicle body to the left with respect to the road surface, the lamp control unit 5 may similarly set the irradiation region and the non-irradiation region of the high beam light distribution pattern PH. Specifically, when the vehicle body is tilted to the left, the lamp control unit 5 specifies the coordinate value of the upper right point, which is the upper right position of the partial pattern, and sets the irradiation region and the non-irradiation region so as to reduce the non-irradiation range in which the oncoming vehicle CV is not irradiated with light.

In the above embodiment, the setting of the irradiation region and non-irradiation region at the time of cornering is performed based on which position the upper left points P1 and P2, which are the upper left positions of the partial patterns PHg and PHh specified as the non-irradiation region at the time of traveling straight, are moved by the inclination of the vehicle body. However, the present disclosure is not limited thereto. For example, when the vehicle body of the motorcycle 100 is tilted to the right, the coordinate values of the upper left points which are the respective upper left positions of the partial patterns PHe to PHi formed on the right of the motorcycle 100 are first calculated, and it is determined whether each of the calculated coordinate values is included in the light-shielding range A of the oncoming vehicle CV. Then, when it is determined that each of the calculated coordinate values is included in the light-shielding range A, it is determined whether the coordinate value exceeds the reference line T. When it is determined that the coordinate value exceeds the reference line T, the partial pattern is set in the non-irradiation region, and when it is determined that the coordinate value does not exceed the reference line T, the irradiation region may be set even when the oncoming vehicle CV is included in the partial pattern.

Second Embodiment

Next, the configuration of the high beam lamp unit 103 included in the headlamp 101 according to a second embodiment will be described with reference to FIGS. 7 and 8.

Figure 7:
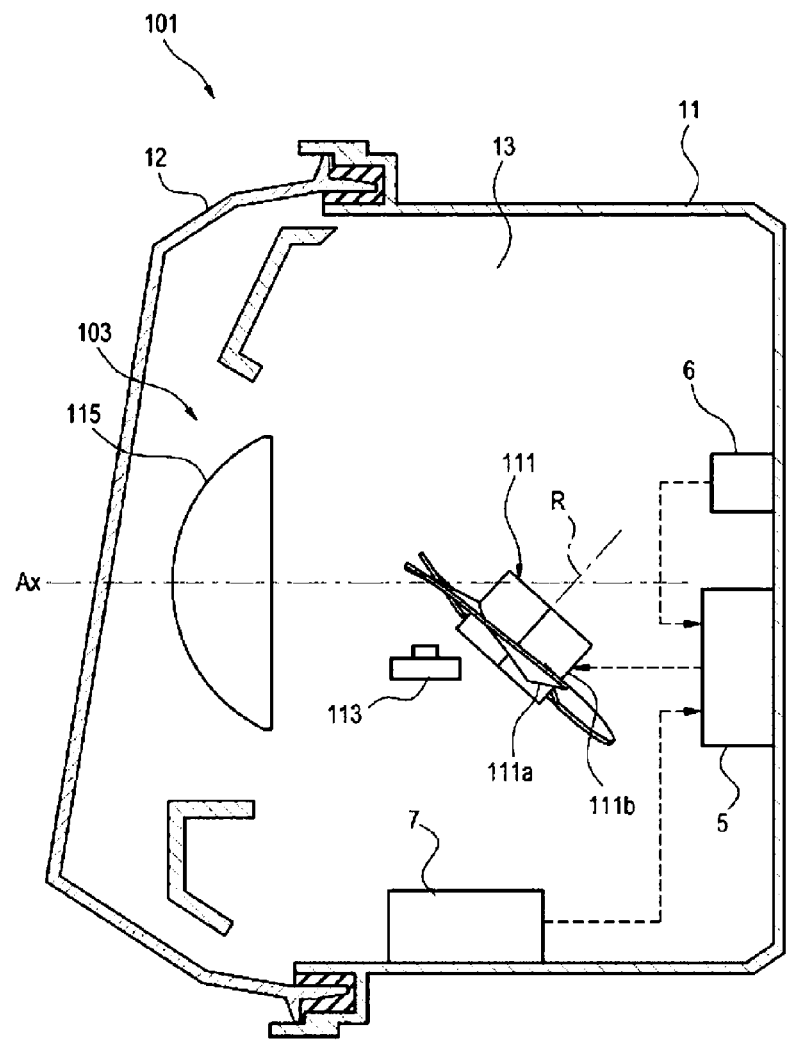
FIG. 7 is a cross-sectional view illustrating the configuration of a high beam lamp unit included in a headlamp according to a second embodiment.

As illustrated in FIG. 7, the high beam lamp unit 103 is a projector type lamp. The high beam lamp unit 103 includes a rotary reflector 111 (an example of an optical member), an LED 113 (an example of a light source), and a projection lens 115 (an example of an optical member) arranged in front of the rotary reflector 111 (an example of an optical member). It is also possible to use a semiconductor light emitting element such as an EL element or an LD element as a light source instead of the LED 113. In particular, a light source that may turn on and off the light accurately in a short time is preferable for the control for non-irradiating a part of the light distribution pattern described later. The shape of the projection lens 115 may be appropriately selected according to the required light distribution pattern, illuminance distribution, and other light distribution characteristics, but an aspherical lens or a free-curved lens is used. In the present embodiment, a convex aspherical lens is used as the projection lens 115.

The rotary reflector 111 rotates in one direction about the rotation axis R by a drive source such as a motor (not illustrated). Further, the rotary reflector 111 includes a reflecting surface configured to reflect the light emitted from the LED 113 while rotating and form a desired light distribution pattern.

Figure 8:
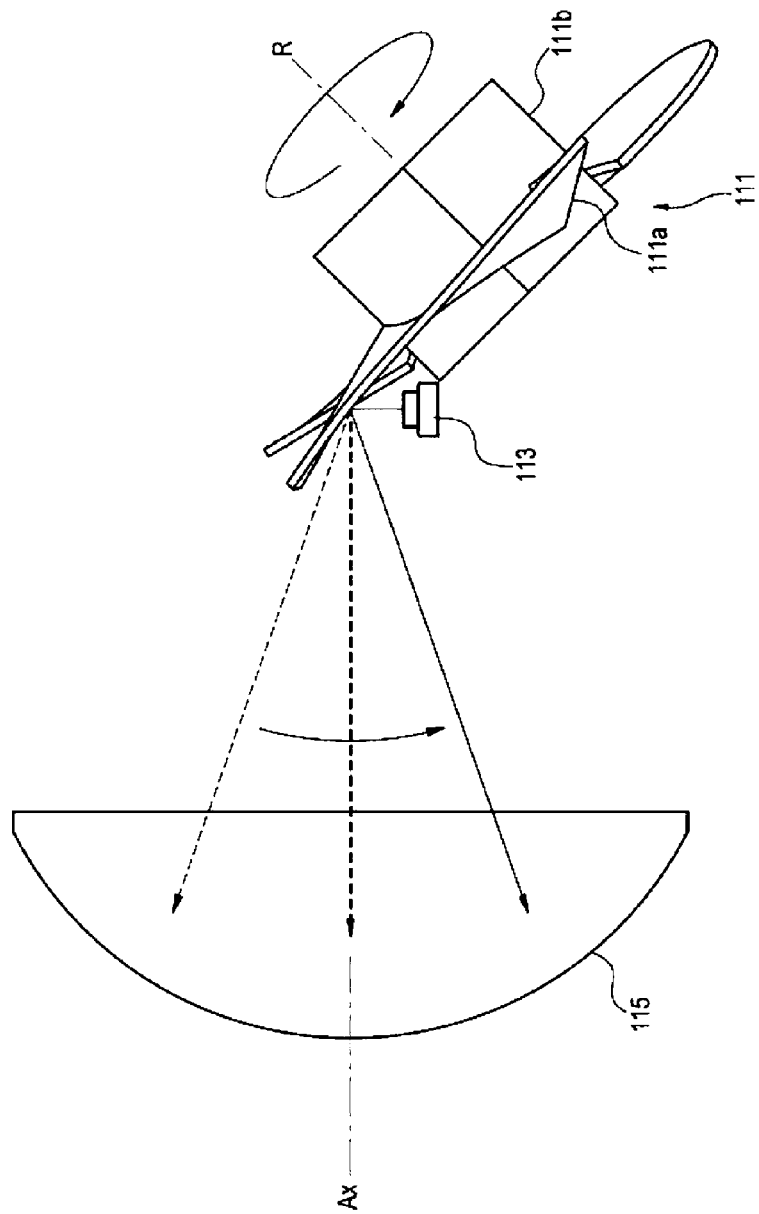
FIG. 8 is a perspective view illustrating the configuration of an optical member included in the high beam lamp unit of FIG. 7.

As illustrated in FIG. 8, the rotary reflector 111 includes three blades 111a having the same shape and a tubular rotating portion 111b. The blade 111a functions as a reflecting surface and is provided around the rotating portion 111b. The rotation axis R of the rotary reflector 111 is oblique to the optical axis Ax, and is provided in a plane including the optical axis Ax and the LED 113.

The blade 111a has a twisted shape so that the angle formed by the optical axis Ax and the reflecting surface changes as it goes in the circumferential direction about the rotation axis R. This enables scanning using the light of the LED 113 as illustrated in FIG. 8. Specifically, the rotary reflector 111 is configured to be rotated 120 degrees so that the light of the LED 113 may scan the front once in one direction (horizontal direction). That is, as one blade 111a passes in front of the LED 113, a desired region in front of the vehicle is scanned once by the light of the LED 113.

Also, in the second embodiment, the lamp control unit 5 calculates how the position of the high beam light distribution pattern PH changes due to the inclination of the vehicle body of the motorcycle 100. Then, in the changed high beam light distribution pattern PH, the high beam light distribution pattern PH is adjusted to irradiate the light of the light source with respect to the partial pattern (second region) changed so as not to give glare to the oncoming vehicle CV (object).

Specifically, the lamp control unit 5 calculates to which position the upper left points P1 and P2, which are the upper left positions of the partial patterns PHg and PHh, respectively, defined as the non-irradiation regions, move due to the motorcycle 100 tilting at an angle θ to the right when the motorcycle 100 is in a straight-ahead state. Assuming that the coordinate values of the upper left points P1 and P2 move to, for example, the coordinate values of the upper left points P3 and P4 by tilting the motorcycle 100 to the right at an angle θ, the lamp control unit 5 then determines whether the coordinate values of the upper left points P3 and P4 exceed the height h of the reference line T set as the position passing through the headlamp P5 of the oncoming vehicle CV. Next, for example, when it is determined that the upper left point P4 does not exceed the height h of the reference line T, the lamp control unit 5 determines that the partial pattern PHh corresponding to the upper left point P4 does not give glare to the oncoming vehicle CV, and sets the partial pattern PHh in the irradiation region. Meanwhile, for example, when it is determined that the upper left point P3 exceeds the height h of the reference line T, the lamp control unit 5 determines that the partial pattern PHg corresponding to the upper left point P3 gives glare to the oncoming vehicle CV, and maintains the setting of the non-irradiation region with respect to the partial pattern PHg. Next, by synchronizing the timing of turning on and off the LED 113 with the rotation of the rotary reflector 111, the lamp control unit 5 controls the operation of the LED 113 and the rotary reflector 111 so that the non-irradiated region of the high beam light distribution pattern PH is not irradiated with the light from the LED 113.

As described above, also in the high beam lamp unit 103 of the scanning optical system provided with the rotary reflector 111, similar to the high beam lamp unit 3 according to the first embodiment provided with the LED array, the coordinate value of the upper left point of the partial pattern is calculated when the vehicle body is tilted. When the coordinate value does not exceed the height h of the reference line T passing through the headlamp P5 of the oncoming vehicle CV, the non-irradiation range in which the oncoming vehicle CV is not irradiated with light may be made as small as possible by setting the partial pattern corresponding to the upper left point in the irradiation region.

Instead of the rotary reflector 111, a high beam lamp unit of a scanning optical system provided with a Galvano mirror or a polygon mirror may be adopted. In this case as well, the same effects as those of the first embodiment and the second embodiment may be obtained by performing the same control as described above.

In each of the above embodiments, the configuration in which the lamp control unit 5, the bank angle sensor 6, and the external sensor 7 are accommodated in the lighting chamber of the headlamp 1 is disclosed, but the present disclosure is not limited to this example. The lamp control unit 5, the bank angle sensor 6, and the external sensor 7 may be arranged separately from the headlamp 1.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
a light source configured to emit a light and provided in a vehicle traveling on a road;
an optical member including a lens and configured to irradiate the light from the light source to a front side of the vehicle lamp and form a predetermined light distribution pattern including a plurality of regions formed in parallel in a single direction;
an environment sensor configured to detect environmental information including an oncoming vehicle;
a controller programmed to control the light source, the optical member and the environment sensor;
wherein the controller is programmed to:
when the oncoming vehicle is detected by the environment sensor while the vehicle travels in a non-cornering state in which the vehicle travels straight, identify, among the plurality of regions, at least one first region including the oncoming vehicle using the environment sensor;
adjust the predetermined light distribution pattern so as to avoid an irradiation of the light to the at least one first region,
when the vehicle enters into a cornering state in which the vehicle is tilted toward a turning direction from the non-cornering state so that the at least one first region is tilted and transformed into a second region in the cornering state, identify a driver of the oncoming vehicle and at least one lamp provided below the driver of the oncoming vehicle using the environment sensor;
set a reference line extending along a horizontal direction across the second region at an height between the driver and the at least one lamp of the oncoming vehicle that are identified using the environment sensor;
acquire inclination information of the second region in the cornering state;
determine in the second region whether there is a third region that includes both an uppermost point and a lowermost point that are positioned below the reference line, based on the inclination information of the second region, and
when determined that there is the third region, irradiate the third region present in the second region with the light even when a portion of the oncoming vehicle is included in the third region.

2. The vehicle lamp according to claim 1, wherein the controller is further programmed to set the reference line to pass through an upper end of the at least one lamp of the oncoming vehicle.

3. The vehicle lamp according to claim 1, wherein the light source includes a plurality of light emitting elements arranged in parallel,
the plurality of regions are formed in parallel along the horizontal direction by light from the plurality of light emitting elements, and
the controller is programmed to turn on a light emitting element that irradiates the third region among the plurality of light emitting elements, and turn off a light emitting element that irradiates a fourth region formed by excluding the third region in the second region, thereby forming the predetermined light distribution pattern.

4. The vehicle lamp according to claim 2, wherein the light source includes a plurality of light emitting elements arranged in parallel,
the plurality of regions are formed in parallel along the horizontal direction by light from the plurality of light emitting elements, and
the controller is programmed to turn on a light emitting element that irradiates the third region among the plurality of light emitting elements, and turn off a light emitting element that irradiates a fourth region formed by excluding the third region in the second region, thereby forming the predetermined light distribution pattern.

5. The vehicle lamp according to claim 1, wherein the optical member includes at least one of a rotary reflector, a Galvano mirror, and a polygon mirror, and
the controller is programmed to control a scanning direction of the light by at least one of the rotary reflector, the Galvano mirror, and the polygon mirror, and control an emission timing of the light from the light source based on the reference line to form the predetermined light distribution pattern in which the third region is irradiated with the light, and a fourth region formed by excluding the third region in the second region is not irradiated with the light.

6. The vehicle lamp according to claim 2, wherein the optical member includes at least one of a rotary reflector, a Galvano mirror, and a polygon mirror, and
the controller is programmed to control a scanning direction of the light by at least one of the rotary reflector, the Galvano mirror, and the polygon mirror and control an emission timing of the light from the light source based on the reference line to form the predetermined light distribution pattern in which the third region is irradiated with the light, and a fourth region formed by excluding the third region in the second region is not irradiated with the light.

7. The vehicle lamp according to claim 3, wherein the optical member includes at least one of a rotary reflector, a Galvano mirror, and a polygon mirror, and
the controller is programmed to control a scanning direction of the light by at least one of the rotary reflector, the Galvano mirror, and the polygon mirror, and control an emission timing of the light from the light source based on the reference line to form the predetermined light distribution pattern in which the third region is irradiated with the light, and the fourth region is not irradiated with the light.

8. The vehicle lamp according to claim 4, wherein the optical member includes at least one of a rotary reflector, a Galvano mirror, and a polygon mirror, and
the controller is programmed to control a scanning direction of the light by at least one of the rotary reflector, the Galvano mirror, and the polygon mirror, and control an emission timing of the light from the light source based on the reference line to form the predetermined light distribution pattern in which the third region is irradiated with the light, and the fourth region is not irradiated with the light.

9. A vehicle system comprising:

a vehicle lamp provided in a vehicle traveling on a road and including:

a light source; and an optical member including a lens and configured to irradiate a light from the light source to a front side of the vehicle and form a predetermined light distribution pattern including a plurality of regions formed in parallel in a single direction;

a sensor configured to detect an oncoming vehicle; and a controller programmed to control the light source, the optical member and the sensor;

wherein the controller is programmed to:

when the oncoming vehicle is detected by the environment sensor while the vehicle travels in a non-cornering state in which the vehicle travels straight, identify, among the plurality of regions, at least one first region including the oncoming vehicle using the environment sensor;

adjust the predetermined light distribution pattern so as to avoid an irradiation of the light to the at least one first region, when the vehicle enters into a cornering state in which the vehicle is tilted toward a turning direction from the non-cornering state so that the at least one first region is tilted and transformed into a second region in the cornering state, identify a driver of the oncoming vehicle and at least one lamp provided below the driver of the oncoming vehicle using the environment sensor;

set a reference line extending along a horizontal direction across the second region at an height between the driver and the at least one lamp of the oncoming vehicle that are identified using the sensor, acquire inclination information of the second region in the cornering state, determine in the second region whether there is a third region that includes both an uppermost point and a lowermost point that are positioned below the reference line, based on the inclination information of the second region, and when determined that there is the third region, irradiate the third region present in the second region with the light even when a portion of the oncoming vehicle is included in the third region.

10. The vehicle lamp according to claim 1, further comprising:

an angle sensor connected to the controller and configured to detect the cornering state of the vehicle.

11. The vehicle lamp according to claim 1, wherein the controller is further programmed to:

determine whether an uppermost point of a fourth region formed by excluding the third region in the second region is positioned above the reference line; and when determined that the uppermost point of the fourth region is positioned above the reference line, turn off a light emitting element such that the irradiation of the light to the fourth region is avoided.

* * * * *